CHARACTER RECOGNITION SYSTEM

Filed June 7, 1965 3 Sheets-Sheet 1

INVENTOR
NICHOLAS DE CLARIS
JAMES C. GREESON JR.
THOMAS B. HORGAN
BY Paul M. Brannen
AGENT

United States Patent Office 3,482,211

Patented Dec. 2, 1969

3,482,211

CHARACTER RECOGNITION SYSTEM

Nicholas De Claris, Ithaca, and James C. Greeson, Jr., and Thomas B. Horgan, Endwell, N.Y., assignors to International Business Machines Corporation, Armonk, N.Y., a corporation of New York Filed June 7, 1965, Ser. No. 461,760

Int. Cl. G06k *9/00*

U.S. Cl. 340—146.3 1 Claim

ABSTRACT OF THE DISCLOSURE

A character recognition system in which the frequency spectrum signature of each of a plurality of unique waveforms derived from the scanning of a plurality of uniquely-shaped characters is determined and the relationship between the energy contained in the particular frequency band is compared with predetermined fractional amounts of the total energy relation of the entire character signal, and the results of such comparisons are combined by suitable logic to provide an output indicative of the character which has been scanned.

This invention relates to character recognition systems and particularly to an improved character recognition system especially useful for reading stylized characters which are designed to provide specific amounts of energy within predetermined frequency bands.

Previous arrangements for recognizing stylized characters have included, for example, matched filter techniques in which a filter is constructed for each character in the set and means are provided for comparing the outputs of the filters at a predetermined sample time. The filter providing the largest output at the selected sample time indicates the character which has been scanned. The use of the matched filter technique is usually implemented by means of a delay line which is sufficiently long to store the input wave form representative of the entire character. Since the delay line must have a length equal to the period of the character, it follows that characters with long periods will require delay lines which cannot be realized with lump parameters but instead require a distributed parameter line which in turn requires a large amount of peripheral equipment.

Another arrangement which has been utilized for recognizing stylized characters is the time domain technique which time divides the voltage time waveshapes of the characters and, by use of discrete thresholds, identifies the presence or absence of predetermined voltage values at predetermined times, which can be arranged in unique combinations for each character.

The foregoing two methods incur problems with respect to economic realization or noise, such as results from ink splatters or voids in the characters, or from variations in distance between the characters and the transducing device which generates a waveshape in accordance with the scanning of the character.

A principal object of the present invention, therefore, is to provide an improved character recognition system for recognizing stylized characters which is substantially unaffected by noise problems and is economical.

Briefly described, the present invention utilizes the fact that each character may be thought of as an assembly or combination of energy packets at fixed positions along the frequency axis. The magnitude of the energy packets present in each character may be expressed as a fraction of the total energy contained in each character. It can be shown that each character in the set may be identified by a set of fractions for each frequency position, which set of fractions are unique in toto for each of the characters involved. By providing suitable means for analyzing the waveform of the characters by determining the placement of the energy with respect to frequency as a result of the satisfaction of the logic conditions within the machine, the character may be uniquely determined. Since in this system a comparison is made between the energy packets at various frequencies and the total energy contained in the character, it is evident that noise caused by variations in transducer spacing will not affect the recognition of the characters since the comparisons are based on relative values rather than absolute values. The energy contained in a voltage time function can be obtained by squaring the function and integrating the result over its period so that it is evident that a comparison of the energy may be made by squaring and integrating all of the energy received as a result of the scanning of the characters and comparing predetermined fractional amounts of this energy with the amount of energy contained within particular frequency bands by obtaining the energy within the frequency band as a result of squaring and integrating the output of a filter which supplies only the frequencies concerned and then comparing the output with the predetermined fraction of the total energy.

Accordingly, another object of the invention is to provide a character recognition system in which the frequency spectrum signature of each of a plurality of unique waveforms is determined and the relationship between the energy contained in a particular frequency band is compared with predetermined fractional amounts of the total energy relation of the character, and the results of such comparisons are combined by suitable logic to provide an output indicative of the waveform which has been analyzed.

Another object of the invention is to provide a waveform analysis system which is free from the effects of random noise.

Another object of the invention is to provide a character recognition system for stylized characters which utilizes relatively inexpensive components in a relatively small number for determining the characters scanned.

Other objects of the invention and features of novelty thereof will be apparent from the subsequent description.

The foregoing and other objects, features and advantages of the invention will be apparent from the following more particular description of a preferred embodiment of the invention, as illustrated in the accompanying drawings.

In the drawings.

Similar reference characters refer to similar parts in each of the several views.

Figure 1:
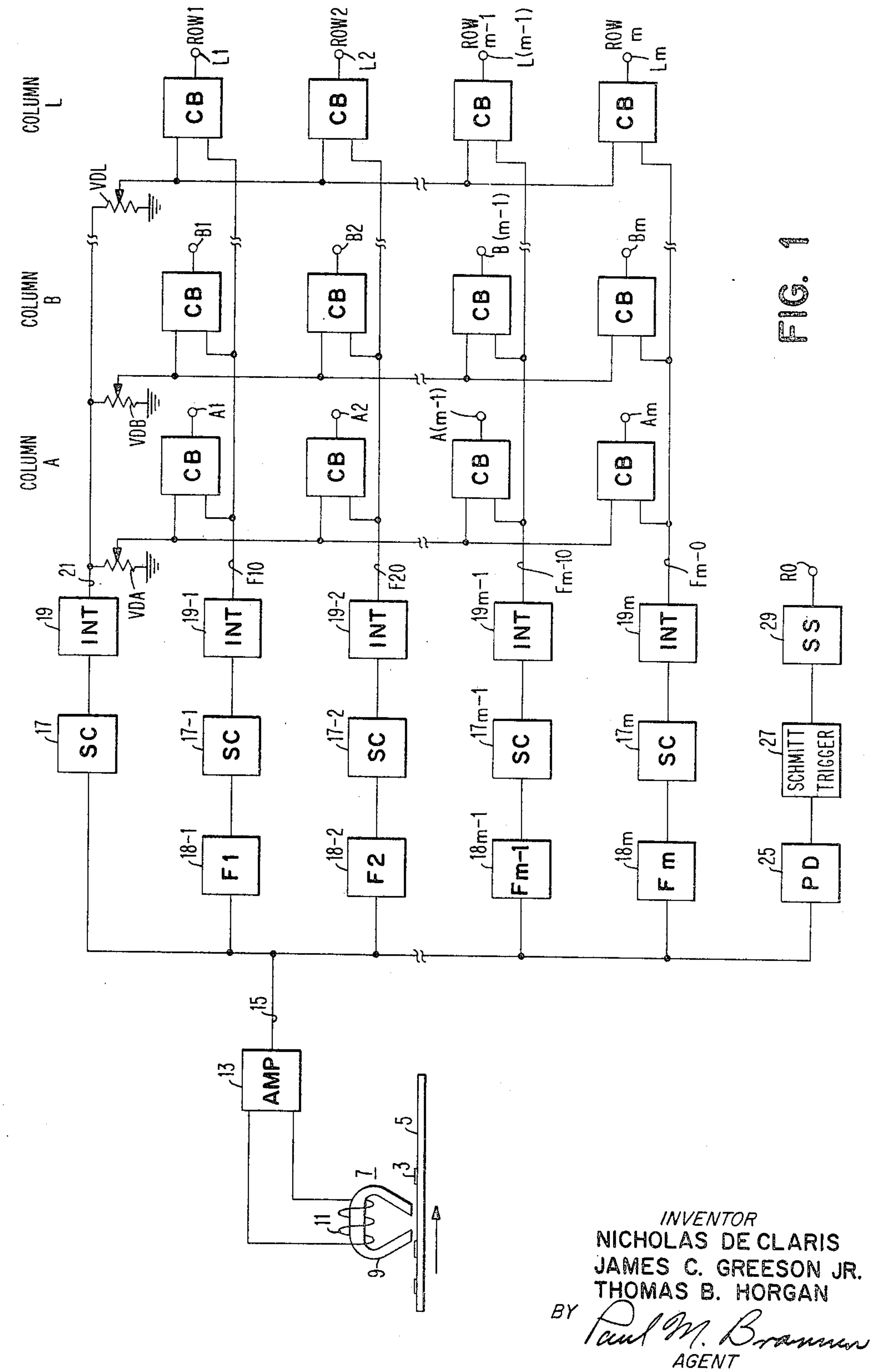
FIG. 1 is a schematic block diagram showing the principal elements of a waveform analysis system embodying the present invention.

Referring now to FIG. 1, there is shown a block diagram schematic view of a character recognition system in accordance with the present invention. The characters 3 on a document 5 are carried past a transducer 7, such as a magnetic read head, in the direction indicated by the arrow, by transport means not shown, so that they pass a nonmagnetic gap in the transducer head 7 comprising a core 9 and a winding 11. With the characters having been previously magnetized, a voltage is induced in winding 11 in accordance with the time rate of change of the flux in the core caused by the passage of the magnetized characters. These signals are analogue in amplitude and time and have a unique voltage-to-time relationship for each character, as a result of the stylizing of the characters. These signals are supplied to a suitable amplifier 13, which is conventional in form and provides for amplifying the output signal from the winding 11 with a high degree of fidelity so that the output line 15 from amplifier 13 contains a replica of the signal generated in winding 11, but at a greatly increased amplitude and/or power level for use in the subsequent circuitry. These amplified signals in common output line 15 of amplifier 13 are supplied to a plurality of circuits for determining total energy content of the character and energy content in particular frequency regions. Considering the apparatus utilized for determining the total energy content of the character, this includes a squaring circuit 17 indicated generally by a reference character SC in the rectangle shown. The squaring circuit may be any one of a number of well-known forms, the exact form of which is not germane to the present invention. One form of squaring circuit which may be used will be described later in connection with FIG. 3. The output of the squaring circuit 17 is supplied to the input of an integrator 19, designated by the rectangle with the legend INT. The integrator is also conventional in nature and one form which may be used in the present system will be described in detail later in connection with FIG. 4. The output of the integrator 19 is supplied to a total energy output bus 21, which has connected thereto the inputs of a plurality of voltage dividers, one for each fractional amount of the energy which it is necessary to provide in order to indicate the appropriate fractional portions representing various characters or groups of characters. These outputs are arranged in columns, three of which are shown, comprising columns A, B and L, but as many columns can be provided as are necessary to provide detection for all the characters in the font. The output on line 15 from amplifier 13 is also supplied to the input of a plurality of filter circuits indicated by the rectangles designated F1, F2, F*m*–1 and F*m* and referred to by reference character 18 with appropriate suffix. In any given instance, by appropriate calculations, it can be determined that *m* frequencies will require examination, and one such filter is provided for each frequency to be so examined. These band-pass filters are relatively conventional in design and one such arrangement will be subsequently described in connection with FIG. 2 at a later time. The output from each of the filters is supplied to an associated squaring circuit 17–1 through **17*m*, similar to the circuit 17 and therefrom to an integrator 19–1 through 19*m* similar to the integrator 19**, so that the output from integrators associated with each frequency channel provides an indication of the amount of energy present at that particular frequency in the pulse signal which results from the scanning of the given character.

The outputs from each of the filters, squaring circuits and integrators associated with a particular frequency band are supplied to an appropriately designated output line, such as the lines F10, F20, F*m*–10 and F*m*0. The output voltage on each of these lines will bear a predetermined relation to the amount of energy present in a particular frequency band in the pulse resulting from the scanning of a stylized character, producing an output signal on the common line 15. The output line, such as line F10, is connected to one input of a plurality of comparator circuits, each designated by a rectangle, including reference character CB, the other input of the comparison circuit or block being connected to the appropriate common line which is indicative of the appropriate fraction of the total energy contained within the character which is scanned. Thus, the comparator block associated with line F10 and the voltage divider VDA provides an output when the voltage on line F10 is at least as great as the voltage on the output of voltage divider VDA. Similarly, the output of a second comparator block, designated B1, will be present when the voltage line F10 is at least as great as the output from voltage divider VDB. There can be provided, as a maximum, one comparison block or circuit for each intersection of the frequency energy output lines with the columnar fractional energy output lines, so that these outputs may be thought of as a type of rectangular matrix in which the columns are formed by the lines carrying fractional amounts, or indicative of fractional amounts of the total energy, while the horizontal rows carry voltages indicative of the amount of energy contained within a frequency band peculiar to that row. Not all of the matrix outputs are usually needed; and, either by calculation or by trial and error, it may be found that certain of the outputs are not required, in which case the comparator block involved would be eliminated. Similarly, in still other cases, it may be found that certain fractional energy values from the line 21 are not required in the decoding of all of the stylized characters, in which case the output from the appropriate voltage divider would not be supplied to every comparison block but, instead, would only be supplied to comparator blocks associated with one particular frequency band and not to the others. Thus, the total number of comparison blocks may range from the maximum involved constituting the product of the number of frequency bands and the number of total energy fractions to some lesser number as determined by calculation or experiment.

The outputs from the comparator blocks will constitute 2-valued or binary signals which are present when the energy in the particular frequency band is at least as great as the fractional portion of the total energy component. In FIG. 1, these outputs are designated by reference characters which are a combined form indicative, firstly, of the column from which they are taken and, secondly, from the row so that, in column A, for example, the outputs reading from top to bottom are A1, A2, A(*m*–1), and, finally A*m*. The manner of designating the other comparator outputs will be obvious from this one example.

Also shown in FIG. 1 is a circuit arrangement for providing a read-out signal which is effective to gate the output of the combinatorial logic to be later described, so that an output is provided therefrom only after sufficient time has been allowed for the decoding of the character by the energy responsive circuits. This circuit is shown at the bottom of FIG. 1 and constitutes a peak detector circuit 25 having its input connected to line 15, the output from the peak detector being supplied to the input of a Schmitt trigger 27, the output of which in turn is connected to the input of a single-shot 29. The output of the single-shot is supplied to a common read-out terminal designated by the reference character R0. One form of peak detector which may be employed will be described later in connection with FIG. 7. The Schmitt trigger and the single-shot are conventional in nature and need not be described in detail. These circuits are proportioned and arranged so that, when an output pulse is provided on line 15 in response to the scanning of the character by the read head 7, the peak detector 25 will provide a signal to Schmitt trigger 27; and the trigger will turn on, when the peak of the input signal is passed, to thereby cause the single-shot 29 to provide a delayed output signal to the terminal R0. The timing is arranged so that the output signal will appear at terminal R0 to act as a gating signal for the recognition logic only after sufficient time has elapsed to permit the energy content of the character being scanned to be determined by the circuits previously described. In this manner, spurious outputs are avoided during a time that the entire character is having its energy content determined.

Figure 6:
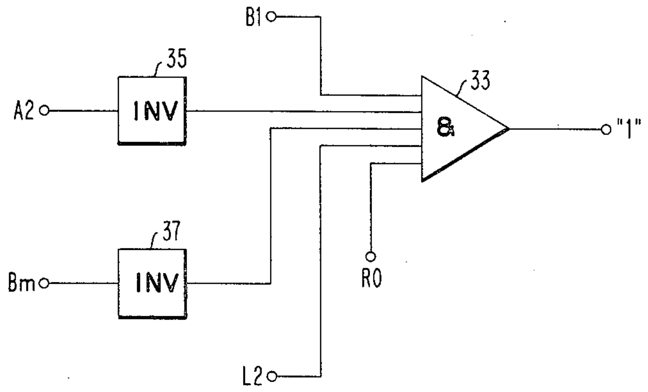
FIG. 6 is one illustration of combinatorial logic which may be used to provide an output indicative of the character scanned.

Both the presence and absence of outputs from the various comparative blocks used in the system are combined with a read-out pulse from terminal R0 in combinatorial logic circuits which indicate at their outputs the character designation for the character that has been scanned. An example of such logic is shown in FIG. 6, which might be utilized, for example, if the analysis of the stylized character "1" required output signals from comparator blocks B1 and L2, but also required that there be no output from the comparator blocks A2 and B*m*. In this instance, a 5-input AND circuit 33 is provided, the output of which is designated as "1," indicating that a character 1 has been scanned. The inputs to the AND circuit are connected to terminals B1 and L2 directly, thus requiring the presence of these two signals for an output; and two more of the inputs to the AND circuit are connected to terminals A2 and B*m* through inverters 35 and 37, so that the inverse of the signals A2 and B*m* is required to provide an output from AND circuit 23. Finally, the remaining input to AND circuit 33 is connected to terminal R0. Accordingly, an output indicative of character 1 will be supplied at terminal "1" when the read-out pulse appears at terminal R0, and the comparator blocks provide outputs B1 and A2; but no output is provided from the comparator blocks supplying terminals A2 and B*m*. This one example will suffice to indicate the manner in which the output logic is designed, and such logic is utilized to provide an output for each of the characters which are scanned. Since the characters are stylized, it should be apparent a unique combination of presence and absence of output signals from the different comparator blocks will occur for each of the characters, and logic similar to that shown in FIG. 6 will adequately decode these combinations of signals to provide a single output signal indicative of the character scanned.

Having thus described the essential features and operation of the system in accordance with our invention, a brief description of certain of the detailed circuits which may be employed in the system will now be provided. It is to be understood that the circuits to be shown and described are exemplary in nature only, and any circuit which is capable of performing the required function may be utilized. Also, it should be noted that the circuitry is not limited to solid-state circuits, but could employ vacuum tube or other electronic circuitry.

Figure 2:
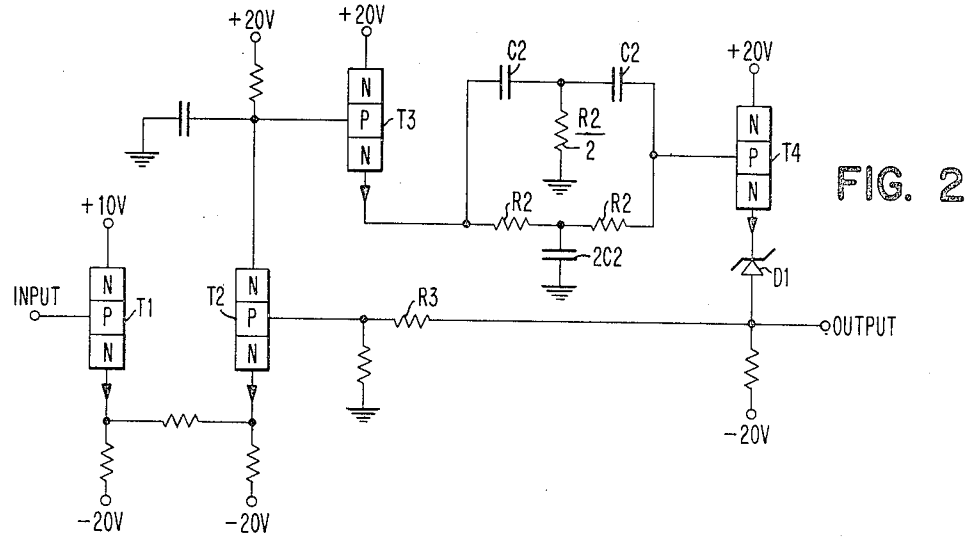
FIG. 2 is a diagrammatic view showing one form of circuitry which may be used for a frequency filter.

Turning now to FIG. 2 of the drawings, this drawing shows one form of frequency filter which may be used in the present invention. The circuit is basically a potentiometric amplifier with a twin-T filter, of conventional design, in the forward path. The input is supplied to the base of a first transistor T1 which is emitter coupled to a second transistor T2, that in turn supplies via its collector circuit a transistor T3 connected to an emitter-follower circuit configuration containing in its output the input of the twin-T filter circuit comprising the usual parallel-T networks of resistors R2, R2 and R2/2 and capacitors C2, C2 and 2C2, the output of which is connected to the base of a fourth transistor T4, the emitter of which supplies, via a Zener diode D1, the feedback path, including a resistor R3, and the output circuit. Such a circuit has the advantages of high input impedance, advantageous since a plurality of them are connected in multiple; a low output impedance for driving subsequent circuitry; and the ability to be simply changed to achieve any center frequency and band-width characteristic desired. This arrangement constitutes a so-called active filter, but it will be apparent to those skilled in the art that passive filters having suitable characteristics could also be employed.

Figure 3:
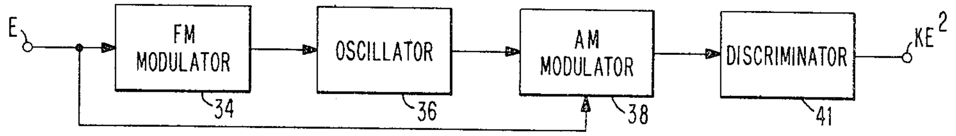
FIG. 3 illustrates one form of circuit which may be used as a squaring circuit.

FIG. 3 illustrates one form of squaring arrangement which may be employed in the subject system. An input voltage applied at terminal E is supplied to the input of an FM modulator 34 which operates in the usual manner to frequency modulate a carrier oscillator 36. The output of the oscillator is supplied to an input of an amplitude modulation modulator 38, where it is amplitude modulated by the same signal supplied to the FM modulator from terminal E. The output on the AM modulator 38, consisting of a signal that is both amplitude and frequency modulated by the same modulating energy, is supplied to the input of a conventional discriminator 41; and the output therefrom is supplied to a terminal designated as $KE^2$; and it can be shown that the output is directly proportional to the square of the input voltage. This arrangement, as well as others, which may be used both for the squaring circuit and certain of the other circuits required in the system, is shown and described in the text, Computer Handbook, edited by Huskey and Korn, 1st ed., published in 1962 by the McGraw-Hill Book Co., Inc. Other arrangements, such as a piece-wise linear approximation, utilizing an amplifier with controlled nonlinearities, or utilization of the logarithmic transfer response of a P-N junction, could be employed to provide a squaring operation. Such circuitry is well known in the art and need not be described in detail.

Figure 4:
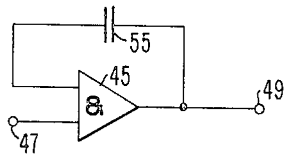
FIG. 4 is a schematic illustration of one form of circuit which may be used as an integrator.

FIG. 4 illustrates in schematic form a conventional Miller-type integrator, which is well known in the analogue computer field, comprising an operational amplifier 45 with an input 47 and output 49, with a feedback circuit including a capacitor 55 from the output 49 to one input of the amplifier 45. These circuits are so well known that a detailed description thereof is considered unnecessary.

Figure 5:
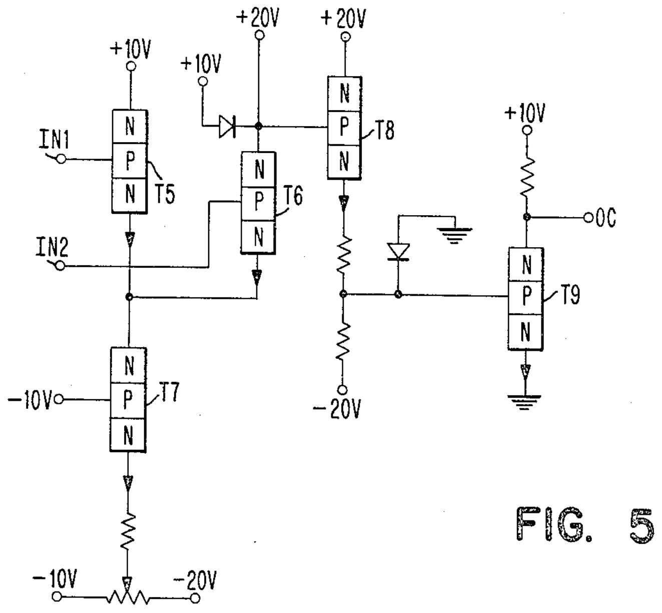
FIG. 5 is a diagrammatic illustration of one form of circuit which may be used as a comparison block.

FIG. 5 illustrates one form of comparator which may be used in the system shown in FIG. 1. The comparator essentially consists of an overdriven differential amplifier. The two inputs are supplied from the terminals IN1 and IN2 to the bases of transistors T5 and T6, which have their emitters connected together and to a constant current source including a transistor T7. The collector of transistor T6 is connected to the base of an emitter-follower T8, which in turn has its output connected to an inverter including the transistor T9. The parts are proportioned and arranged so that, when the input differential is greater than a predetermined amount, as can be obtained by setting the voltage dividing resistance connected to the emitter of T7, an output signal is supplied at terminal OC. As pointed out in connection with the other circuits, the circuitry shown is exemplary only; and many different types of comparator circuits could be used.

Figure 7:
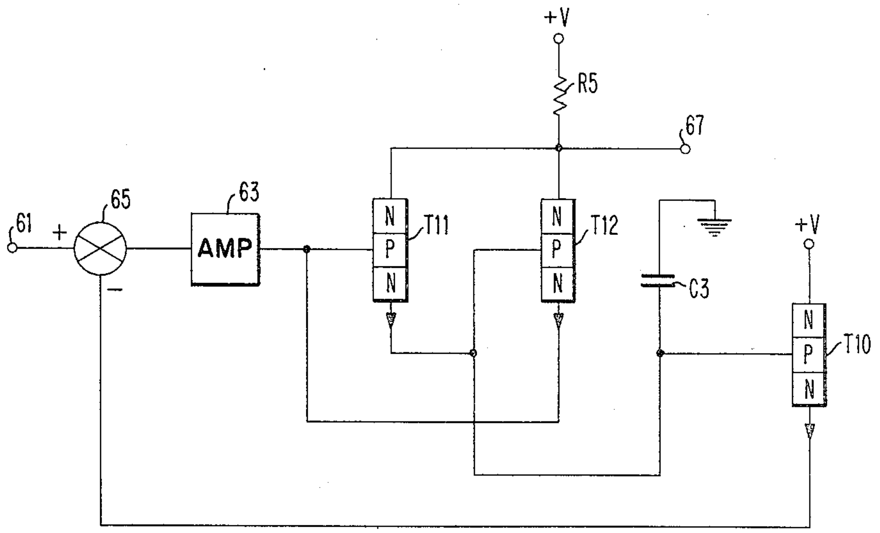
FIG. 7 is a schematic illustration of one form of peak detector which may be employed in the present system.

FIG. 7 illustrates in a schematic form one type of peak detector which may be employed with the present system. An input voltage supplied at terminal 61 is supplied to the input of a high gain amplifier 63 via a subtracting circuit 65, the other input of the subtracting circuit being connected to the emitter of a transistor T10. The output of amplifier 63 is connected to the base of a transistor T11 and to the emitter of transistor T12. The base of transistor T10 is connected to the emitter of transistor T11 and the base of transistor T12, and a capacitor C3 is connected between the base of transistor T10 and ground. The collector of transistor T10 is connected to a positive source of voltage +V, and the collectors of transistors T11 and T12 are also connected to +V via a resistor R5 with an output terminal 67 connected to the collectors of T11 and T12. The output of amplifier 63 may be considered as a circuit node at which a voltage proportional to the difference between the voltage on capacitor C3 and the input voltage at terminal 61 appears. The amplifier gain is high and the difference is forced to be small by feedback. While the input voltage at terminal 61 is moving positively or increasing, the capacitor C3 will, by virtue of the feedback, be charging in a positive direction. The only path for this charging is through the base emitter circuit of transistor T11. When a peak is reached and passed in the voltage supplied to terminal 61, the capacitor C3 must begin to charge in a negative direction through transistor T12, base-to-emitter circuit, which again makes the output negative. Accordingly, as the peak of the input of voltage supplied to terminal 61 is crossed, switching between transistors T11 and T12 occurs, and the output voltage goes positive for a brief interval, this output voltage being capable of utilization in firing the Schmitt trigger.

From the foregoing, it will be seen that the present invention provides a simplified character recognition system for recognition of unique waveforms, in which there is a unique distribution of energy content with respect to frequency, compared with the total energy which is contained in each of the waveforms. The recognition operation contemplates the derivation of the total energy in the character and the comparison of predetermined amounts of this total energy with the energy packets which occur in various frequency bands, the combinations of these arrangements being unique for each character, and such conditions being indicated by binary valued outputs which, when supplied to suitable combinatorial logic circuits, can be decoded to indicate the waveform which has been analyzed.

While the invention has been particularly shown and described with reference to a preferred embodiment thereof, in a character recognition system for stylized characters, it will be understood by those skilled in the art that various changes in form and details may be made therein without departing from the spirit and scope of the invention.

What is claimed is:

1. A character recognition system comprising, in combination:

scanning means for scanning characters to be recognized and developing an electrical scan signal which is unique for each character to be recognized, first energy content determining means for determining the total energy content of said scan signal and providing a first output signal proportional to the total energy of said scan signal, a plurality of voltage divider means connected to the output of said first energy content determining means to provide voltages indicative of fractional portions of said first output signal for comparison purposes, second energy content determining means for determining the energy content of said scan signal at a plurality of frequency ranges and providing a plurality of second output signals corresponding to the energy content of said scan signal at said frequency ranges, said first and said second energy determining means each comprising a squaring circuit means and integrating circuit means, comparator means for comparing said second output signals with portions of said first output signal supplied from said voltage divider means and providing a plurality of third output signals corresponding to energy contents in specific frequency ranges exceeding at least selected portions of the total energy content of said scan signal, logic means connected to said comparator means for developing a character signal in accordance with specific combinations of said third output signals, and readout control means governing said logic means to permit outputs therefrom only after a predetermined time following the scanning of a character.

References Cited

UNITED STATES PATENTS

| | | | |
|---|---|---|---|
| 3,129,287 | 4/1964 | Bakis. | |
| 2,851,661 | 9/1958 | Buland | 324—77 |
| 3,167,710 | 1/1965 | Cox | 324—77 |
| 3,215,934 | 11/1965 | Sallen | 324—77 |
| 3,320,576 | 5/1967 | Dixon | 340—5 |
| 3,332,064 | 7/1967 | Marsh | 340—146.3 |

MAYNARD R. WILBUR, Primary Examiner

J. M. THESZ, Assistant Examiner